United States Patent
Paatero

(10) Patent No.: US 8,730,691 B2
(45) Date of Patent: May 20, 2014

(54) POWER CONVERSION APPARATUS AND METHODS EMPLOYING VARIABLE-LEVEL INVERTERS

(75) Inventor: Esa Kai Paatero, Helsinki (FI)

(73) Assignee: Eaton Corporation, Cleveland, OH (US)

(*) Notice: Subject to any disclaimer, the term of this patent is extended or adjusted under 35 U.S.C. 154(b) by 196 days.

(21) Appl. No.: 13/105,700

(22) Filed: May 11, 2011

(65) Prior Publication Data
US 2012/0287690 A1 Nov. 15, 2012

(51) Int. Cl.
*H02H 7/122* (2006.01)
*H02M 7/537* (2006.01)

(52) U.S. Cl.
USPC ........................................ 363/56.01; 363/131

(58) Field of Classification Search
USPC .................. 363/55, 56.01, 95, 123, 131–134
See application file for complete search history.

(56) References Cited

U.S. PATENT DOCUMENTS

| | | | |
|---|---|---|---|
| 3,775,663 A | 11/1973 | Turnbull | |
| 5,361,196 A | 11/1994 | Tanamachi et al. | |
| 5,910,892 A | 6/1999 | Lyons et al. | |
| 6,314,007 B2 | 11/2001 | Johnson, Jr. et al. | |
| 6,333,569 B1 | 12/2001 | Kim | |
| 6,795,323 B2 | 9/2004 | Tanaka et al. | |
| 6,838,925 B1 | 1/2005 | Nielson | |
| 7,050,311 B2* | 5/2006 | Lai et al. .......................... | 363/37 |
| 7,126,409 B2 | 10/2006 | Nielsen | |
| 7,145,268 B2 | 12/2006 | Edwards et al. | |
| 7,573,732 B2 | 8/2009 | Teichmann et al. | |
| 7,920,393 B2* | 4/2011 | Bendre et al. ................... | 363/39 |
| 8,228,695 B2* | 7/2012 | Roesner et al. ............ | 363/56.01 |
| 2002/0051370 A1 | 5/2002 | Reichard | |
| 2006/0245216 A1* | 11/2006 | Wu et al. .......................... | 363/13 |
| 2011/0013438 A1* | 1/2011 | Frisch et al. ................... | 363/131 |
| 2011/0141779 A1* | 6/2011 | Joseph ............................ | 363/95 |
| 2011/0273159 A1* | 11/2011 | Tabata .......................... | 323/311 |
| 2012/0161858 A1* | 6/2012 | Permuy et al. ................ | 327/536 |
| 2012/0218795 A1* | 8/2012 | Mihalache ...................... | 363/97 |
| 2012/0320643 A1* | 12/2012 | Yang .......................... | 363/56.01 |

FOREIGN PATENT DOCUMENTS

WO WO 2004/064456 7/2004

OTHER PUBLICATIONS

*Motor Bearing Current Phenomenon and 3-Level Inverter Technology*; Yaskawa Electric America, Inc., Product Application Note, Applicable Produict: G7, Rev: 06-06; Jun. 22, 2005; pp. 1-13.
Ji Taek Yoon et al. "Base/Gate Drive Suppression Methods for NPC Inverter Legs", IEEE, 1996, pp. 1784-1789.
Invitation to Pay Additional Fees, Partial International Search Report, PCT/US2012/037057.

* cited by examiner

*Primary Examiner* — Adolf Berhane
(74) *Attorney, Agent, or Firm* — Myers Bigel Sibley & Sajovec, P.A.

(57) ABSTRACT

A power conversion apparatus, such as an uninterruptible power supply, included first and second DC busses, a neutral node and an inductor configured to be coupled to a load. The apparatus further includes an inverter circuit coupled to the first and second DC busses, to the neutral node and to the inductor and configured to selectively couple the first and second DC busses and the neutral node to a first terminal of the inductor to generate an AC voltage at a second terminal of the inductor such that, in a given half-cycle of the AC voltage, the inverter circuit uses a switching sequence wherein the first DC bus, the second DC bus and the neutral node are successively coupled to the first terminal of the inductor.

21 Claims, 4 Drawing Sheets

POWER CONVERSION APPARATUS AND METHODS EMPLOYING VARIABLE-LEVEL INVERTERS

BACKGROUND

The inventive subject matter relates to power conversion circuits and methods and, more particularly, to inverter apparatus and methods.

UPS systems are commonly used in installations such as data centers, medical centers and industrial facilities. UPS systems may be used in such installations to provide backup power to maintain operation in event of failure of the primary utility supply. These UPS systems common have an "on-line" configuration including a rectifier and inverter coupled by a DC link that is also coupled to an auxiliary power source, such as a battery, fuel cell or other energy storage device.

UPS systems, motor drives and other power conversion devices commonly use an inverter that generates an AC output from a DC power source, such as a rectifier and/or battery. A "two level" bridge inverter may be use to selectively connected these DC buses to the output of the inverter to generate an AC voltage waveform. Multilevel inverters may provide for additional voltages between the DC bus voltages. Various multilevel inverter circuits are described, for example, in U.S. Pat. No, 5,361,196 to Tamamachi et al., U.S. Pat. No. 6,795,323 to Tanaka et al., U.S. Pat. No. 6,838,925 to Nielsen, U.S. Pat. No. 7,145,268 to Edwards et al. and U.S. Pat. No. 7,573,732 to Teichmann et al.

A UPS may use a split DC link arrangement including two DC voltage busses having positive and negative voltages with respect to a neutral. A potential issue with split link inverter arrangements is that unbalanced loads, such as loads having input half-wave rectification, may cause voltage imbalances of the DC link bus voltages with respect to the load neutral. Imbalances in DC busses feeding an inverter may be addressed by a balancer circuit as described, for example, in U.S. Pat. No. 3,775,663 to Turnbull and U.S. Pat. No. 6,314,007 to Johnson, Jr. et al.

SUMMARY

Some embodiments of the inventive subject matter provide a power conversion apparatus including first and second DC busses, a neutral node and an inductor configured to be coupled to a load. The apparatus further includes an inverter circuit coupled to the first and second DC busses, to the neutral node and to the inductor and configured to selectively couple the first and second DC busses and the neutral node to a first terminal of the inductor to generate an AC voltage at a second terminal of the inductor such that, in a given half-cycle of the AC voltage, the inverter circuit uses a switching sequence wherein the first DC bus, the second DC bus and the neutral node are successively coupled to the first terminal of the inductor. In some embodiments, the inverter circuit may be configured to couple the first DC bus to the first terminal of the inductor to increase a magnitude of the AC voltage and then to couple the second DC bus to the first terminal of the inductor to discharge the inductor. Discharge of the inductor may counteract an imbalance of the first and second DC busses with respect to the neutral node. For example, discharge of the inductor may cause a charge rebalance between first and second capacitors coupled between respective ones of the first and second DC busses and the neutral node. In some embodiments, the inverter circuit may be configured to decouple the second DC bus from the first terminal of the inductor and then couple the neutral node to the first terminal of the inductor responsive to a current in the inductor.

In some embodiments, a power conversion apparatus includes first and second DC busses and an inverter circuit coupled to the first and second DC busses and to a first terminal of the inductor and configured to selectively transition between different inverter level modes of operation to compensate for imbalance of the first and second DC busses with respect to a neutral node. The apparatus may further include an inductor configured to couple an output of the inverter to a load, and the inverter circuit may be configured to transition between inverter level modes to route current from the inductor to compensate for the imbalance. The inverter circuit may be configured to selectively route current from the inductor to first and second capacitances coupled between a neutral node and respective ones of the first and second DC busses. The inverter circuit may be configured to transition between inverter level modes responsive to a current in the inductor.

Related power conversion methods are also described.

DETAILED DESCRIPTION OF EXEMPLARY EMBODIMENTS

Figure 1:
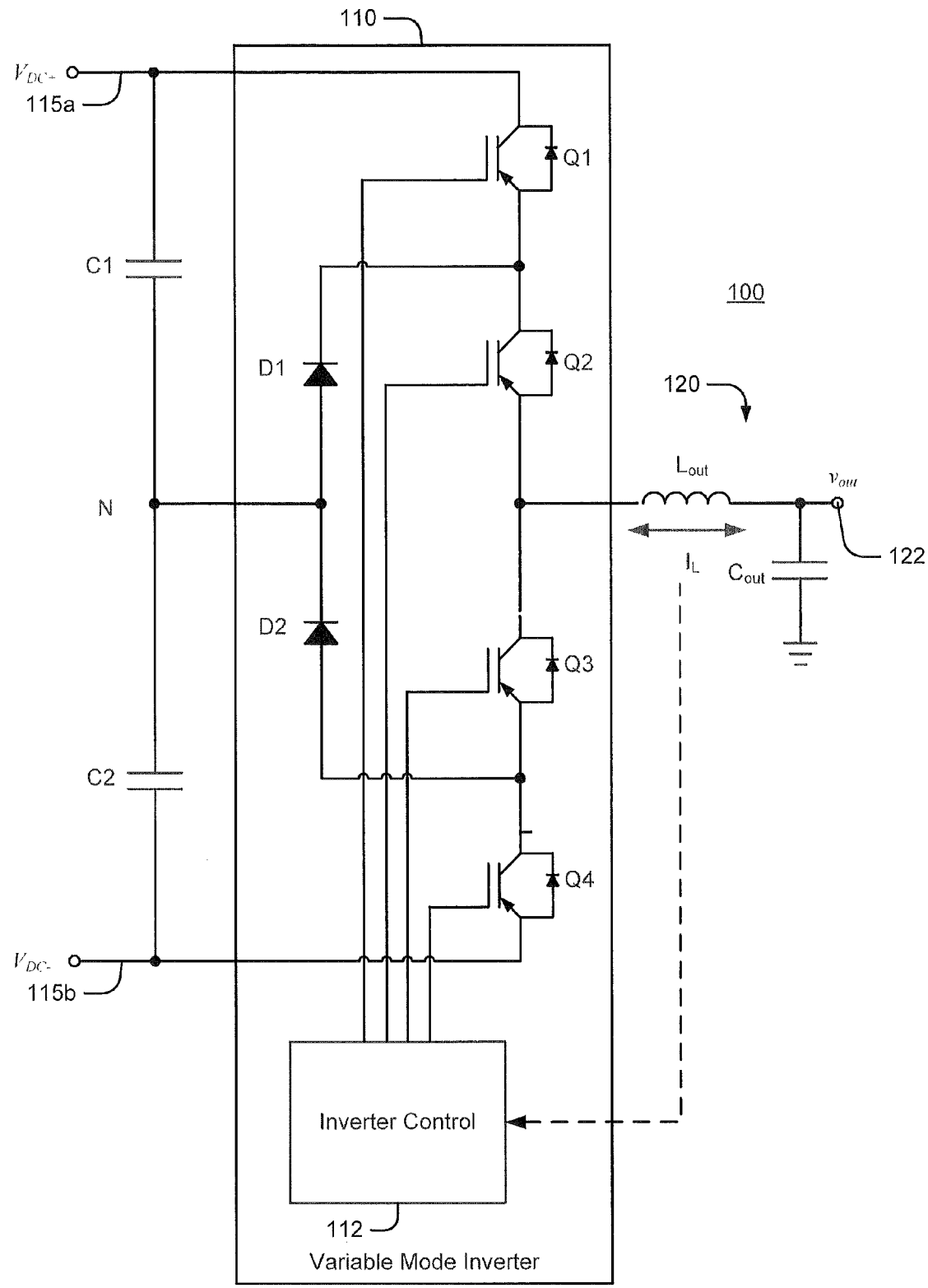
FIG. 1 is a schematic diagram illustrating a power conversion apparatus according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a power conversion apparatus 100 according to some embodiments of the inventive subject matter. The apparatus 100 includes first and second DC busses 115a, 115b, which have respective first and second DC voltages $V_{DC+}$, $V_{DC-}$ associated therewith. The DC busses 115a, 115b may be powered by, for example, a rectifier circuit and/or a DC energy storage and/or generation device, such as a battery, fuel cell or photovoltaic device. A variable mode inverter circuit 110 is coupled to the first and second DC busses 115a, 115b and to an output filter 120 that includes an inductor $L_{out}$ and a capacitor $C_{out}$. The inverter circuit 110 produces an AC output voltage $v_{out}$ at an output node 122 of the filter 120 from the DC voltages $V_{DC+}$, $V_{DC-}$.

The inverter circuit 110 includes a first serially-connected pair of transistors Q1, Q2 that are coupled between the first DC bus 115a and the inductor $L_{out}$ and a second serially-connected pair of transistors Q3, Q4 that are coupled between the second DC bus 115b and the inductor $L_{out}$. Respective first and second diodes D1, D2 couple respective nodes between the transistors of the respective pairs to a neutral node N. Respective capacitors C1, C2 are coupled between respective ones of the first and second DC busses 115a, 115b and the neutral node N.

It will be appreciated that the arrangement of the transistors Q1, Q2, Q3, Q4 illustrated in FIG. 1 is one conventionally used to implement a three-level inverter in which three voltages, i.e., the DC bus voltages $V_{DC+}$, $V_{DC-}$ and the voltage at the neutral node N, are applied to the output filter inductor $L_{out}$. According to some embodiments of the inventive subject matter, however, an inverter control circuit 112 controls the transistors Q1, Q2, Q3, Q4 to support different inverter level modes of operation such that the inverter circuit 110 may compensate for imbalance of the first and second DC busses 115a, 115b with respect to the neutral node N. According to some embodiments, the inverter control circuit 112 may apply control signals to the transistors Q1, Q2, Q3, Q4 such that, within a given half cycle of the AC output voltage $v_{out}$, the inverter circuit 110 selectively transitions between a two-level inverter mode and a three-level inverter mode.

Figure 2:
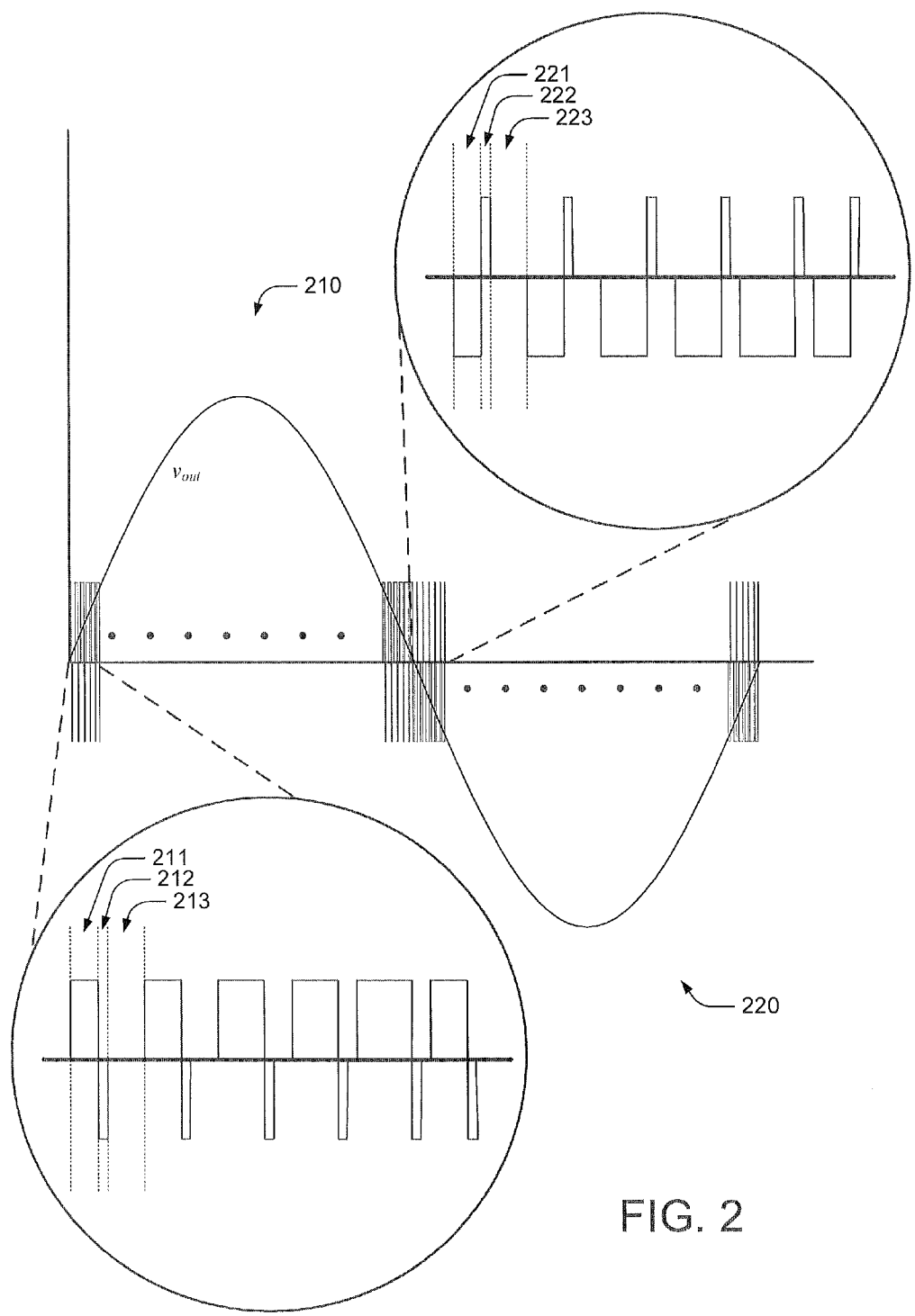
FIG. 2 is a graph illustrating operations of the power conversion apparatus of FIG. 1.
Figure 3:
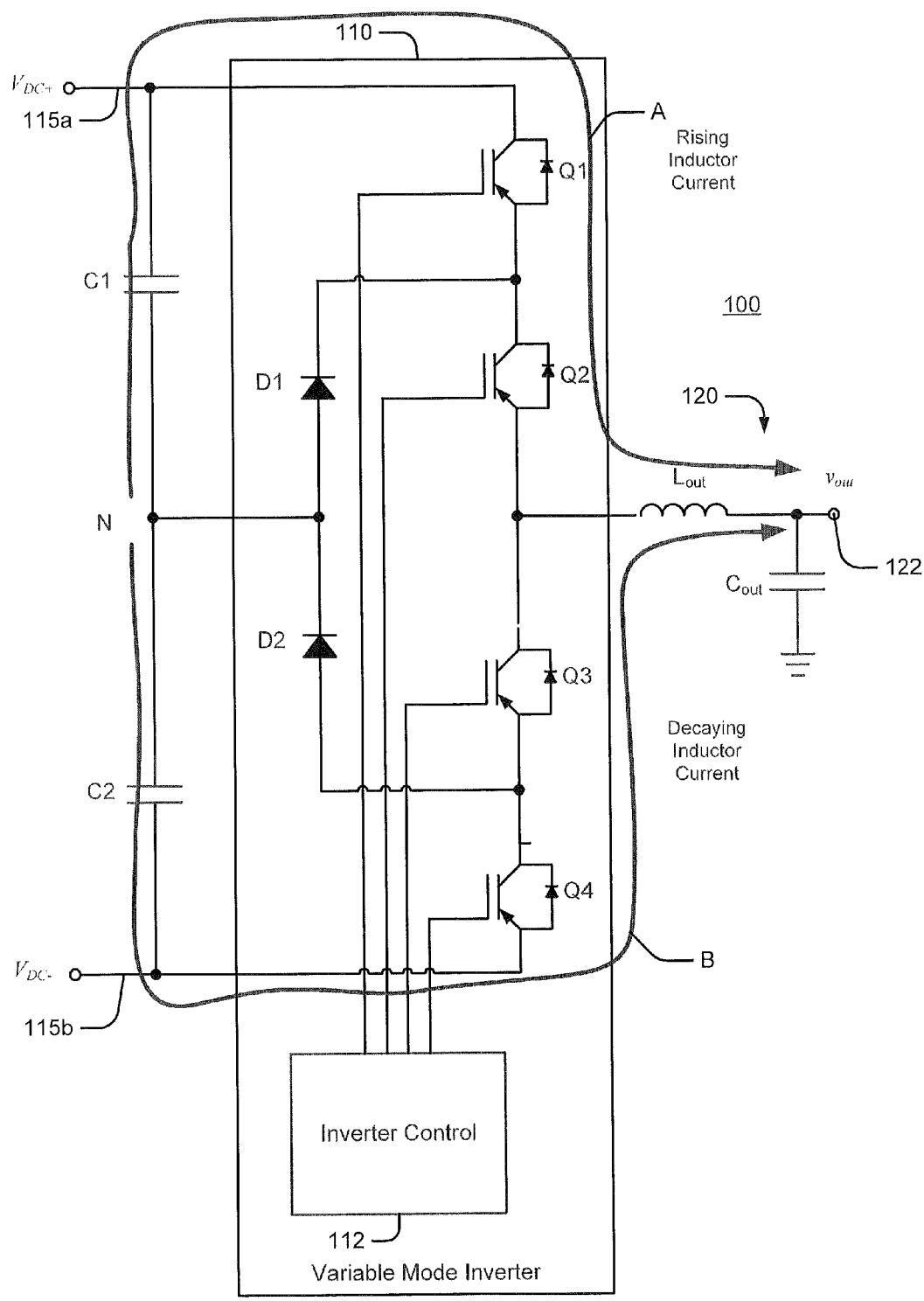
FIG. 3 is a schematic diagram illustrating operations of the power conversion apparatus of FIG. 1.

Referring to FIGS. 2 and 3 in conjunction with FIG. 1, the inverter control circuit 112 may implement an output voltage control loop that conforms the output voltage $v_{out}$ to a desired AC voltage waveform. In a positive half cycle 210 of the output voltage $v_{out}$, the control circuit 112 may turn the first and second transistors Q1, Q2 "on" during a first period 211 such that the first DC bus 115a is coupled to the output inductor $L_{out}$ and a current $i_L$ flows through the inductor $L_{out}$ towards the output node 122, causing the magnitude of the output voltage $v_{out}$ to increase toward the value of the desired AC voltage waveform. This current flow A is illustrated in FIG. 3.

When the output voltage control loop determines that the output voltage $v_{out}$ has reached a desired level, the inverter control circuit 112 turns off the first and second transistors Q1, Q2. At this point, the output inductor $L_{out}$ has accumulated a certain amount of stored energy from the current flowing therethrough. The inverter control circuit 112 uses this energy to equalize the DC busses 115a, 115b by momentarily transitioning to a two level inverter mode by closing both the third and fourth transistors Q3, Q4 during an interval 212 such that energy is transferred between the first and second capacitors C1, C2 by a current flow B illustrated in FIG. 3. After most or all of the energy stored in the inductor $L_{out}$ is delivered, the inverter control circuit 112 turns off the fourth transistor Q4 and turns on the second transistor Q2 for an interval 213 such that the inverter circuit 110 transitions to a three-level inverter mode. Referring to FIG. 1, this transition may be triggered by the inverter control circuit 112 responsive to the current $i_L$ through the output inductor $L_{out}$, e.g., when the inductor current $i_L$ approaches zero, the inverter control circuit 112 may turn off the fourth transistor Q4 and turn on the second transistor Q2. This feedback may be provided, for example, using a current sensor or other device that generates a signal representative of the inductor current $i_L$.

A similar sequence of operations occurs for a negative half-cycle 220 of the output voltage $v_{out}$. In the negative half cycle 220 of the output voltage $v_{out}$, the control circuit 112 may turn the third and fourth transistors Q3, Q4 "on" during a first period 221 such that the second DC bus 115b is coupled to the output inductor $L_{out}$ and a current $i_L$ flows through the inductor $L_{out}$ towards the output node 122, causing the magnitude of the output voltage $v_{out}$ to increase toward the value of the desired AC voltage waveform.

When the output voltage control loop determines that the output voltage $v_{out}$ has reached a desired level, the inverter control circuit 112 turns off the third and fourth transistors Q3, Q4. At this point, the output inductor $L_{out}$ has accumulated a certain amount of stored energy from the current flowing therethrough. The inverter control circuit 112 uses this energy to equalize the DC busses 115a, 115b by momentarily transitioning to a two level inverter mode by turning on the first and second transistors Q1, Q2 during an interval 222 such that energy is transferred between the first and second capacitors C1, C2. After most or all of the energy stored in the inductor $L_{out}$ is delivered, the inverter control circuit 112 turns of the first transistor Q1 and turns on the third transistor Q3 for an interval 223 such that the inverter circuit 110 transitions to a three-level inverter mode.

It will be appreciated that, although the above discussion relates to inverter configuration that support two- and three-level inverter mode operation, the inventive subject matter is applicable to inverter configurations that support inverter levels greater than three. It will also be understood that the inventive subject matter may be embodied in a wide variety of power conversion apparatus, including, but not limited to, motor drives, power supplies and auto and marine inverter systems.

Figure 4:
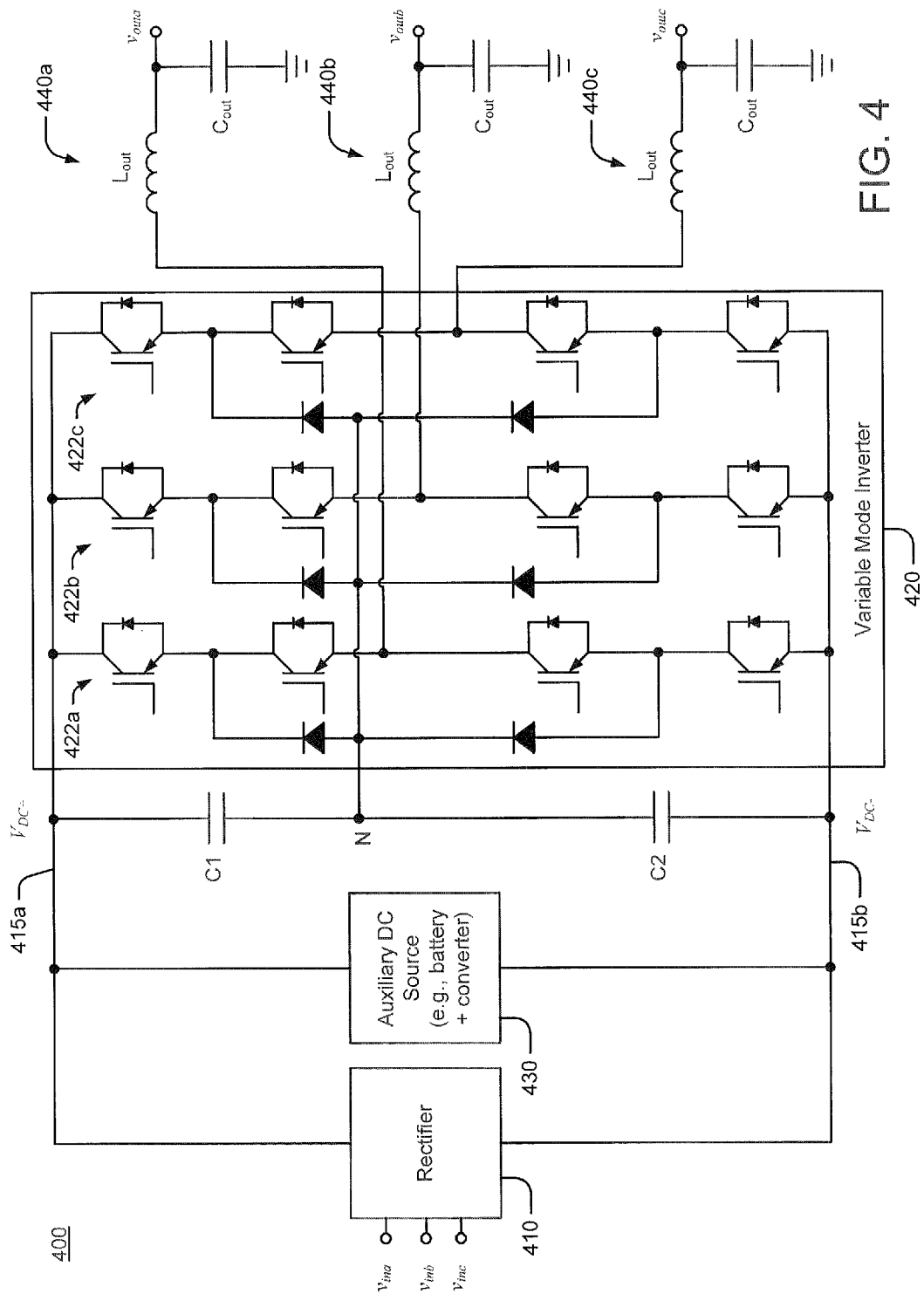
FIG. 4 is a schematic diagram illustrating an uninterruptible power supply (UPS) according to further embodiments of the inventive subject matter.

Embodiments of the inventive subject matter may be used to particular advantage in uninterruptible power supply (UPS) applications. FIG. 4 illustrates a UPS 400 including a three phase variable mode inverter circuit 420 along the lines discussed above. The inverter circuit 420 includes three legs 422a, 422b, 422b controlled by a control circuit (not illustrated for purposes of clarity). Respective ones of the legs are coupled to respective output filter circuits 440a, 440b, 440c, each of which include an output inductor $L_{out}$ and capacitor $C_{out}$. The respective filter circuits 440a, 440b, 440c produce respective output phase voltages $V_{outa}$, $v_{outb}$, $v_{outc}$. The inverter circuit 420 is coupled to first and second DC busses 415a, 415b and to a neutral node N. Respective capacitors C1, C2 are coupled between respective ones of the DC voltage busses 415a, 415b and the neutral node N. A rectifier circuit 410 generates DC voltages $V_{DC+}$, $V_{DC-}$ on the DC voltage busses 415a, 415b from a three-phase AC source having phase voltages $v_{ina}$, $v_{inb}$, $v_{inc}$. An auxiliary DC power source 430 is coupled to the DC busses 415a, 415b and provides power thereto. The auxiliary source 430 may include, for example, a battery coupled to the DC busses 415a, 415b by a battery converter/charger circuit.

Operating the inverter circuit 420 in a variable level mode along the lines described with reference to FIGS. 1-3 may eliminate a need to provide a separate balancer circuit to maintain a balance of the DC bus voltages $V_{DC+}$, $V_{DC-}$. Instead, energy stored in the output filter inductors $L_{out}$ may be used to balance the DC bus voltages $V_{DC+}$, $V_{DC-}$ along the lines discussed above. This may be particularly useful when the UPS 400 is used to drive unbalanced loads.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A power conversion apparatus comprising:
   first and second DC busses;
   a neutral node;
   an inductor configured to be coupled to a load; and
   an inverter circuit coupled to the first and second DC busses, to the neutral node and to the inductor and configured to selectively couple the first and second DC busses and the neutral node to a first terminal of the inductor to generate an AC voltage at a second terminal of the inductor such that, in a given half-cycle of the AC voltage, the inverter circuit uses a switching sequence wherein the first DC bus, the second DC bus and the neutral node are successively coupled to the first terminal of the inductor.

2. The apparatus of claim 1, wherein the inverter circuit is configured to couple the first DC bus to the first terminal of the inductor to increase a magnitude of the AC voltage and then to couple the second DC bus to the first terminal of the inductor to discharge the inductor.

3. The apparatus of claim 2, wherein discharge of the inductor counteracts an imbalance of the first and second DC busses with respect to the neutral node.

4. The apparatus of claim 2, wherein the discharge of the inductor causes a charge rebalance between first and second capacitors coupled between respective ones of the first and second DC busses and the neutral node.

5. The apparatus of claim 2, wherein the inverter circuit is configured to decouple the second DC bus from the first terminal of the inductor and then couple the neutral node to the first terminal of the inductor responsive to a current in the inductor.

6. The apparatus of claim 1, wherein the inverter circuit is configured to selectively operate in different inverter level modes to balance the first and second DC busses with respect to the neutral node.

7. The apparatus of claim 6, wherein the inverter circuit is configured to selectively operate in the different inverter level mode responsive to a current in the inductor.

8. An uninterruptible power supply comprising the apparatus of claim 1.

9. A power conversion apparatus comprising:
   first and second DC busses; and
   an inverter circuit coupled to the first and second DC busses and to a first terminal of the inductor and configured to selectively transition between different inverter level modes of operation to compensate for imbalance of the first and second DC busses with respect to a neutral node.

10. The apparatus of claim 8, further comprising an inductor configured to couple an output of the inverter to a load, and wherein the inverter circuit is configured to transition between inverter level modes to route current from the inductor to compensate for the imbalance.

11. The apparatus of claim 10, wherein the inverter circuit is configured to selectively route current from the inductor to first and second capacitances coupled between a neutral node and respective ones of the first and second DC busses.

12. The apparatus of claim 10, wherein the inverter circuit is configured to transition between inverter level modes responsive to a current in the inductor.

13. The apparatus of claim 9, wherein the different inverter level modes comprise a two-level inverter mode and a three-or-greater level inverter mode.

14. The apparatus of claim 9, wherein the inverter circuit is configured to selectively couple the first and second DC busses and a neutral node to an output inductor using a switching sequence wherein the first DC bus, the second DC bus and the neutral node are successively coupled to the output inductor.

15. An uninterruptible power supply comprising the apparatus of claim 9.

16. A method comprising:
   selectively transitioning an inverter between different inverter level modes of operation to compensate for imbalance of first and second DC busses coupled to the inverter.

17. The method of claim 16, wherein selectively transitioning an inverter between different inverter level modes of operation to compensate for imbalance of first and second DC busses coupled to the inverter comprises transitioning between inverter level modes to route current from an inductor coupling the inverter to a load.

18. The method of claim 17, wherein transitioning between inverter level modes to route current from an inductor coupling the inverter to a load comprises selectively route current from the inductor to first and second capacitances coupled between a neutral node and respective ones of the first and second DC busses.

19. The method of claim 17, wherein transitioning between inverter level modes to route current from an inductor coupling the inverter to a load comprises transitioning between inverter level modes responsive to a current in the inductor.

20. The method of claim 16, wherein the different inverter level modes comprise a two-level inverter mode and a three-or-greater level inverter mode.

21. The method of claim 16, wherein selectively transitioning an inverter between different inverter level modes of operation to compensate for imbalance of first and second DC busses coupled to the inverter comprises selectively coupling the first and second DC busses and a neutral node to an output inductor using a switching sequence wherein the first DC bus, the second DC bus and the neutral node are successively coupled to the output inductor.

* * * * *